Dec. 2, 1952 H. G. LUBSZYNSKI ET AL 2,620,393
CIRCUITS FOR REINSERTING DIRECT CURRENT
AND LOW-FREQUENCY COMPONENTS
Filed July 12, 1949

INVENTORS
HANS GERHARD LUBSZYNSKI AND
ERIC LAWRENCE CASLING WHITE.

BY J. O. Ollier
Attorney

Patented Dec. 2, 1952 2,620,393

UNITED STATES PATENT OFFICE 2,620,393

CIRCUITS FOR REINSERTING DIRECT CURRENT AND LOW-FREQUENCY COMPONENTS

Hans Gerhard Lubszynski, Northwood, and Eric Lawrence Casling White, Richings Way, Iver, England, assignors to Electric & Musical Industries Limited, Hayes, Middlesex, England, a company of Great Britain Application July 12, 1949, Serial No. 104,278
In Great Britain July 15, 1948

4 Claims. (Cl. 178—7.2)

Figure 1:
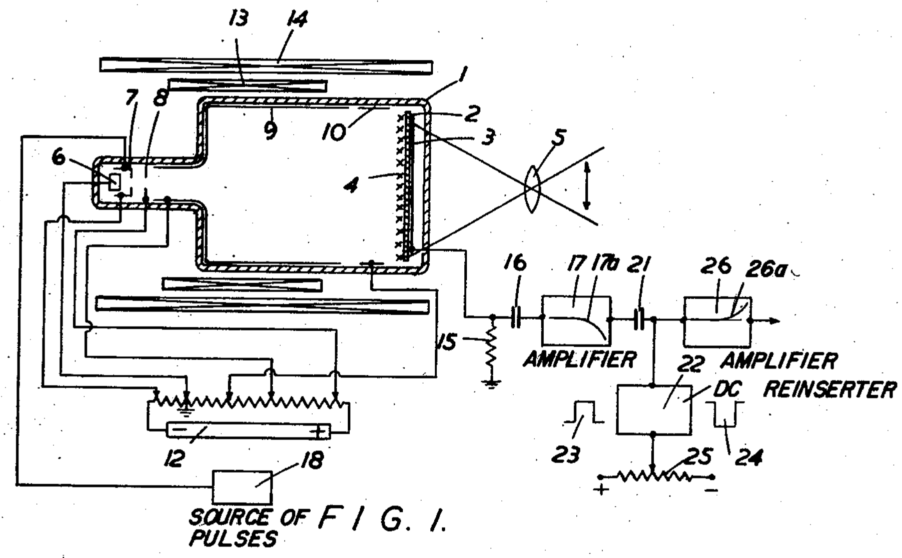

This invention relates to television transmitting systems.

In television systems the picture signals are usually generated by a pick-up tube and are usually fed through an amplifier employing A. C. couplings with the result that the D. C. and low-frequency components of the signals are lost and, consequently, it is necessary to re-establish the D. C. level in the picture signals so that signals representing black in the picture signals correspond to a predetermined D. C. level.

In some types of pick-up tube the image for transmission is projected on to a photo-electric target electrode which is associated with a signal electrode and is arranged to be scanned by a high-velocity electron scanning beam which serves to restore the elements of the target electrode to an equilibrium potential which corresponds substantially to that of an anode employed in the tube to accelerate the scanning beam. The picture signals which are generated in such a type of tube may not contain any signal corresponding to true black and hence, when employing such tubes, the black level is usually set manually by an operator. In another type of tube, however, instead of scanning the target electrode with a high-velocity scanning beam the target electrode is scanned by a low-velocity scanning beam so that the equilibrium potential of the elements of the target electrode is stabilised substantially at the potential of the cathode of the tube which generates the scanning beam. In this latter type of pick-up tube true black level corresponds to the condition when none of the current in the scanning beam is collected by the target electrode. When employing pick-up tubes it is usually the practice to suppress the electron beam during the line and frame fly-back periods. It is found, however, that during the suppression intervals spurious oscillatory signals of relatively large amplitude are picked up by the signal electrode owing to capacitive or inductive pick-up from the scanning coils associated with the pick-up tube. These spurious signals exist for substantially the whole of the line fly-back periods and consequently mask the true black level which is set up when the beam is suppressed. Now it has been found that the spurious oscillatory signals above referred to are substantially symmetrical, that is to say, they have an average amplitude corresponding substantially to zero, and therefore correspond to picture black and, accordingly, it is the object of the present invention to employ the spurious oscillatory signals for the purpose of re-inserting D. C. and low-frequency signals which may have become lost.

According to the invention, there is provided a television transmitting system comprising a pick-up tube having a cathode, a target electrode including a signal electrode, means for scanning said target electrode with a low velocity cathode ray beam to set up picture signals in said signal electrode, means for stabilizing the potential of said target electrode at a potential corresponding substantially to that of said cathode, means for suppressing said beam during flyback periods to cause spurious substantially symmetrical oscillatory signals to be picked up by said signal electrode, means for smoothing said spurious signals and means for reinserting low frequency and D. C. components of said picture signals with reference to the signal remaining after smoothing said spurious signals.

Figure 3:
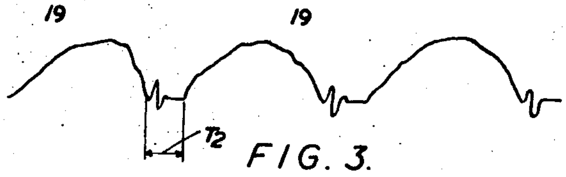
Figure 4:
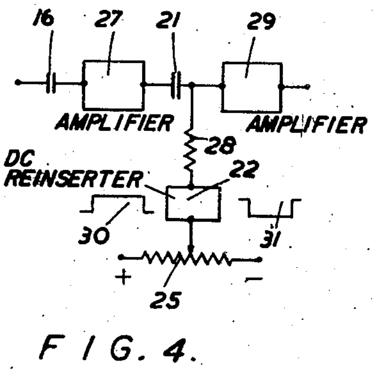
Figure 5:
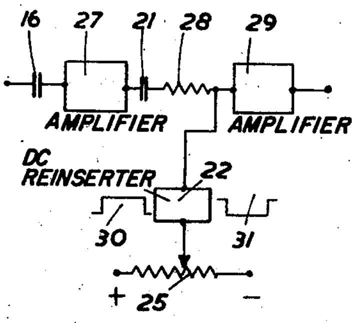

In order that the said invention may be clearly understood and readily carried into effect, it will now be more fully described with reference to the accompanying drawings, in which:

Figure 1 illustrates diagrammatically a circuit arrangement of a television transmitting system together with means for re-inserting lost low-frequency and D. C. components in accordance with one embodiment of the invention, Figure 2 illustrates the waveform of television signals which are generated by the pick-up tube shown in Figure 1, Figure 3 illustrates the waveform after attenuation, and Figures 4 and 5 are block diagrams of further embodiments of the invention.

In the circuit shown in Figure 1, picture signals are generated in a cathode ray pick-up tube 1, which comprises a target electrode composed of a transparent insulating layer such as glass or mica 2, having on one side a transparent signal electrode 3, and on the other side a multiplicity of photo-electric mosaic elements 4. An optical image of an object for transmission is projected through the transparent signal electrode 3 on to the mosaic elements 4 through a suitable optical lens indicated at 5. The mosaic elements are arranged to be scanned by a low-velocity scanning beam which is generated by a suitably disposed electron gun. The electron gun comprises a cathode 6, a cathode shield 7, an apertured anode 8 and a further electrode 9 consisting of a metallic wall coating. The cathode 6 may be maintained at earth potential, the shield 7 at a negative potential with respect thereto, the anode 8 at a positive potential, and the electrode 9 usually at a slightly lower positive potential than the anode 8. Near to the target electrode is a decelerating electrode 10 which is maintained at a less positive potential than the electrode 9. The electrodes 6 to 10 are conventionally shown as deriving their potentials from a potentiometer 11 connected across a source of potential 12. The electron beam from the gun is accelerated by the anode 8 and decelerated by the electrodes 9 and 10 and is scanned over the surface of the target electrode at line and frame frequencies by scanning coils indicated at 13. The electron beam is focussed by and is arranged to scan the mosaic elements in the presence of a longitudinal magnetic field set up by a solenoid 14 and the arrangement is such that the beam is caused to impinge on the target electrode substantially normally throughout the whole scanning cycle. The pick-up tube shown in Figure 1 and the manner in which it operates is well known and when the mosaic elements are scanned, picture signals are set up across the signal resistance 15 connected to the signal electrode 3, said signals being fed through a condenser 16 to amplifier 17.

The electron beam from the cathode 6 is arranged to be suppressed during line and frame fly-back periods for which purpose the shield 7 is supplied with suitable pulses from a source indicated at 18 so that during these periods no electrons from the cathode 6 are collected by the target electrode. The pick-up tube shown in Figure 1 during these periods provides an output in the signal electrode which has an average amplitude representative of picture black. It is found, however, that during the line fly-back periods spurious signals of oscillatory and symmetrical nature are picked up in the signal electrode 3 owing to capacitive or inductive pick-up from the scanning coils 13, with the result that these spurious signals tend to mask the black picture signals which would be generated in the signal electrode when the scanning beam is suppressed if spurious signals were not present.

Figure 2:
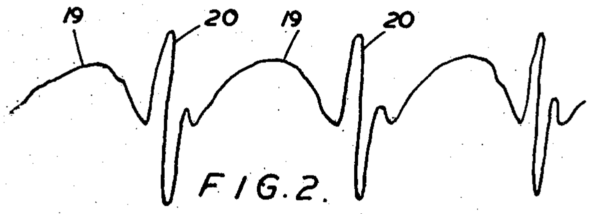

Figure 2 of the drawings illustrates the waveform of signals set up in the signal electrode 3 and as shown in this figure, the reference numeral 19 indicates picture signals generated during line scan periods and the reference numerals 20 indicate the spurious signals which are picked up by the signal electrode during line fly-back periods. In the present invention these spurious signals are smoothed and the signal remaining after smoothing is employed for the purpose of re-inserting lost D. C. and low-frequency components. As shown in Figure 1, the signals from the signal electrode 3 are fed through the condenser 16 to the amplifier 17 which is arranged to have a low response to high-frequency signals as indicated by the response curve 17*a*. The high frequency components of the spurious signals 20 which are picked up by the signal electrode 3 during line fly-back periods thus become smoothed so that towards the end of the line fly-back periods the spurious signals have an amplitude which is substantially zero and corresponds to picture black.

In Figure 3 of the drawings which illustrates the waveform of the signals after having passed through the amplifier 17 it will be observed that during the line fly-back periods $T_2$ the spurious signals 20 are smoothed to such an extent that towards the end of the line fly-back periods they correspond substantially to picture black. The output from the amplifier 17 is fed via condenser 21 to a re-inserting device 22 which contains a bi-directionally conducting switch and also an observing device such as described in United States Patent No. 2,328,946 or a reinserting device as described in United States Patent No. 2,190,753. The bi-directionally conducting switch contained in the device 22 may be of the kind described in United States Patent No. 2,258,732 and is arranged to be rendered conducting by pulses 23 and 24 so that re-insertion is effected when the level of the smoothed signals corresponds to picture black. The device 22 is connected to a tapping point on potentiometer 25 so that the black level is set at a desired value determined by the position of the tapping point on the potentiometer 25. After re-insertion the signals are fed to a further amplifier 26 in which the higher frequencies of the picture signals are boosted so that the overall response of the amplifiers 17 and 26 has a substantially flat characteristic. The response curve of the amplifier 26 is indicated at 26*a*.

Instead of smoothing the spurious signals in the amplifier 17 as in Figure 1, the signals from condenser 16 can be fed to an amplifier 27 (Figure 4) and the spurious signals are smoothed by passing them to the device 22 through an integrator comprising condenser 21 and resistance 28. After effecting reinsertion the signals are fed to a further amplifier 29. In the circuit of Figure 4, the bi-directionally conducting switch, which may be of the kind described in United States Patent No. 2,258,732, contained in the device 22 is required to be switched into operation for the whole of the line fly-back periods for which the switching pulses 30 and 31 have a duration corresponding to the line fly-back periods. The time constant of the condenser 21 and the resistance 28 should preferably be long compared with the fly-back periods. If the fly-back period is 10 micro-seconds the time constant of the condenser 21 and resistance 28 should be about 100 micro-seconds.

Figure 5 of the drawings illustrates an alternative form of circuit to that shown in Figure 4 in which the resistance 28 is connected between the amplifier 29 and the condenser 21. This embodiment has the advantage that the spurious oscillatory signals are smoothed at the input of the amplifier 29 as well as at the input to the switching device 22. The spurious signals may well be about ten times the picture signal amplitude and although such signals may be finally removed from the signal train by suppression at a subsequent point in the transmission system, they may give rise to overloading of the amplifiers prior to the point of suppression. Hence, by employing the circuit shown in Figure 5, smoothing of the spurious signals is effected and it may be possible to effect smoothing to such a degree that subsequent suppression is rendered unnecessary. To achieve a high degree of smoothing the resistance 28 should be made large compared with the internal resistance of the switching device 22 which, if constituted by a switch containing four germanium rectifiers or diodes, may be of the order of 50 to 200 ohms. In such a case the resistance 28 may be of the order of 2000 ohms or more. With such a degree of smoothing loss of response of the higher frequencies of the picture signals will be encountered, but this difficulty can be overcome by boosting the high frequencies in the output of the amplifier 27.

What we claim is:

1. A television transmitting system comprising a pick-up tube having a cathode, a target electrode including a signal electrode, means for scanning said target electrode with a low velocity cathode ray beam to set up picture signals in said signal electrode, means for stabilizing the potential of said target electrode at a potential corresponding substantially to that of said cathode, means for suppressing said beam during flyback periods to cause spurious substantially symmetrical oscillatory signals to be picked up by said signal electrode, means for smoothing said spurious signals, and means for reinserting low frequency and direct current components of said picture signals with reference to the signal remaining after smoothing said spurious signals.

2. A television transmitting system comprising a pick-up tube having a cathode, a target electrode including a signal electrode, means for scanning said target electrode with a low velocity cathode ray beam to set up picture signals in said signal electrode, means for stabilizing the potential of said target electrode at a potential corresponding substantially to that of said cathode, means for suppressing said beam during flyback periods to cause spurious substantially symmetrical oscillatory signals to be picked up by said signal electrode, an amplifier having a low response to high frequency signals, means for feeding said spurious signals to said amplifier to smooth said signals, means for reinserting low frequency and D. C. components of said picture signals, said means including a direct current reinserting device, and means for switching said device into operation towards the ends of said flyback periods at instants when said smoothed signals have a substantially zero amplitude.

3. A television transmitting system according to claim 2 including a further amplifier having an amplification characteristic to effect boosting of high frequency signals, and means for feeding said picture signals after direct current reinsertion through said further amplifier.

4. A television transmitting system comprising a pick-up tube having a cathode, a target electrode including a signal electrode, means for scanning said target electrode with a low velocity cathode ray beam to set up picture signals in said signal electrode, means for stabilizing the potential of said target electrode at a potential corresponding substantially to that of said cathode, means for suppressing said beam during flyback periods to cause spurious substantially symmetrical oscillatory signals to be picked up by said signal electrode, means for smoothing said spurious signals including a series combination of a condenser and a resistance, and direct current reinserting means comprising a D. C. reinserting device and means for switching said device into operation for substantially the whole of said flyback periods.

HANS GERHARD LUBSZYNSKI.
ERIC LAWRENCE CASLING WHITE.

REFERENCES CITED

The following references are of record in the file of this patent:

UNITED STATES PATENTS

| Number | Name | Date |
|---|---|---|
| 2,190,753 | Browne et al. | Feb. 20, 1940 |
| 2,244,240 | Blumlein | June 3, 1941 |
| 2,295,330 | Blumlein | Sept. 8, 1942 |
| 2,299,328 | Kell | Oct. 20, 1942 |
| 2,303,909 | Blumlein | Dec. 1, 1942 |
| 2,305,902 | Schroeder | Dec. 22, 1942 |
| 2,307,375 | Blumlein et al. | Jan. 5, 1943 |
| 2,363,800 | Moffett | Nov. 28, 1944 |
| 2,445,040 | Schade | July 15, 1948 |
| 2,451,640 | Thalner | Oct. 19, 1948 |